US 9,511,758 B2

(12) United States Patent
Nakata et al.

(10) Patent No.: US 9,511,758 B2
(45) Date of Patent: Dec. 6, 2016

(54) HYDRAULIC BRAKE SYSTEM

(71) Applicants: TOYOTA JIDOSHA KABUSHIKI KAISHA, Toyota-shi (JP); ADVICS CO., LTD., Kariya (JP)

(72) Inventors: Daisuke Nakata, Seto (JP); Yusuke Kamiya, Okazaki (JP); Takahiro Okano, Chiryu (JP); Yoshio Masuda, Anjyo (JP); Yosuke Yamasoe, Kariya (JP)

(73) Assignees: TOYOTA JIDOSHA KABUSHIKI KAISHA, Toyota-shi (JP); ADVICS CO., LTD., Kariya (JP)

( * ) Notice: Subject to any disclaimer, the term of this patent is extended or adjusted under 35 U.S.C. 154(b) by 24 days.

(21) Appl. No.: 14/564,696

(22) Filed: Dec. 9, 2014

(65) Prior Publication Data

US 2015/0175145 A1 Jun. 25, 2015

(30) Foreign Application Priority Data

Dec. 23, 2013 (JP) ................................. 2013-264740

(51) Int. Cl.
| | |
|---|---|
| *B60T 17/22* | (2006.01) |
| *B60T 11/16* | (2006.01) |
| *B60T 7/04* | (2006.01) |
| *B60T 13/14* | (2006.01) |
| *B60T 13/66* | (2006.01) |
| *B60T 13/68* | (2006.01) |

(52) U.S. Cl.
CPC .............. *B60T 17/222* (2013.01); *B60T 7/042* (2013.01); *B60T 11/16* (2013.01); *B60T 13/146* (2013.01); *B60T 13/662* (2013.01); *B60T 13/686* (2013.01)

(58) Field of Classification Search
CPC ......... B60T 11/10; B60T 11/16; B60T 13/146; B60T 13/148; B60T 13/662; B60T 17/222; B60T 7/04
USPC ......................................................... 188/352
See application file for complete search history.

(56) References Cited

U.S. PATENT DOCUMENTS

| | | | | |
|---|---|---|---|---|
| 6,196,642 B1* | 3/2001 | Sekiguchi | ............. | B60T 8/4072 303/115.4 |
| 2005/0110341 A1* | 5/2005 | Kusano | ................ | B60T 8/4081 303/113.4 |
| 2013/0232966 A1* | 9/2013 | Murayama | .............. | B60T 7/042 60/545 |

(Continued)

FOREIGN PATENT DOCUMENTS

| | | |
|---|---|---|
| JP | 2007-186140 | 7/2007 |
| JP | 2012-126307 A | 7/2012 |

*Primary Examiner* — Robert A Siconolfi
*Assistant Examiner* — San Aung
(74) *Attorney, Agent, or Firm* — Oblon, McClelland, Maier & Neustadt, L.L.P.

(57) ABSTRACT

A hydraulic brake system includes: a brake hydraulic-pressure control device capable of controlling a hydraulic pressure in a brake cylinder of a hydraulic brake configured to reduce a rotation of a wheel, the brake hydraulic-pressure control device including (i) a piston, (ii) a hydraulic-pressure chamber provided opposite the piston, and (iii) a moving-force control device configured to apply a moving force to the piston and capable of controlling the moving force; and an air reducing device configured to control the moving-force control device to move the piston to reduce air in an air reduction target portion including the hydraulic-pressure chamber.

6 Claims, 6 Drawing Sheets

(56) References Cited

U.S. PATENT DOCUMENTS

2014/0319903 A1* 10/2014 Murayama .............. B60T 8/368
303/15

* cited by examiner

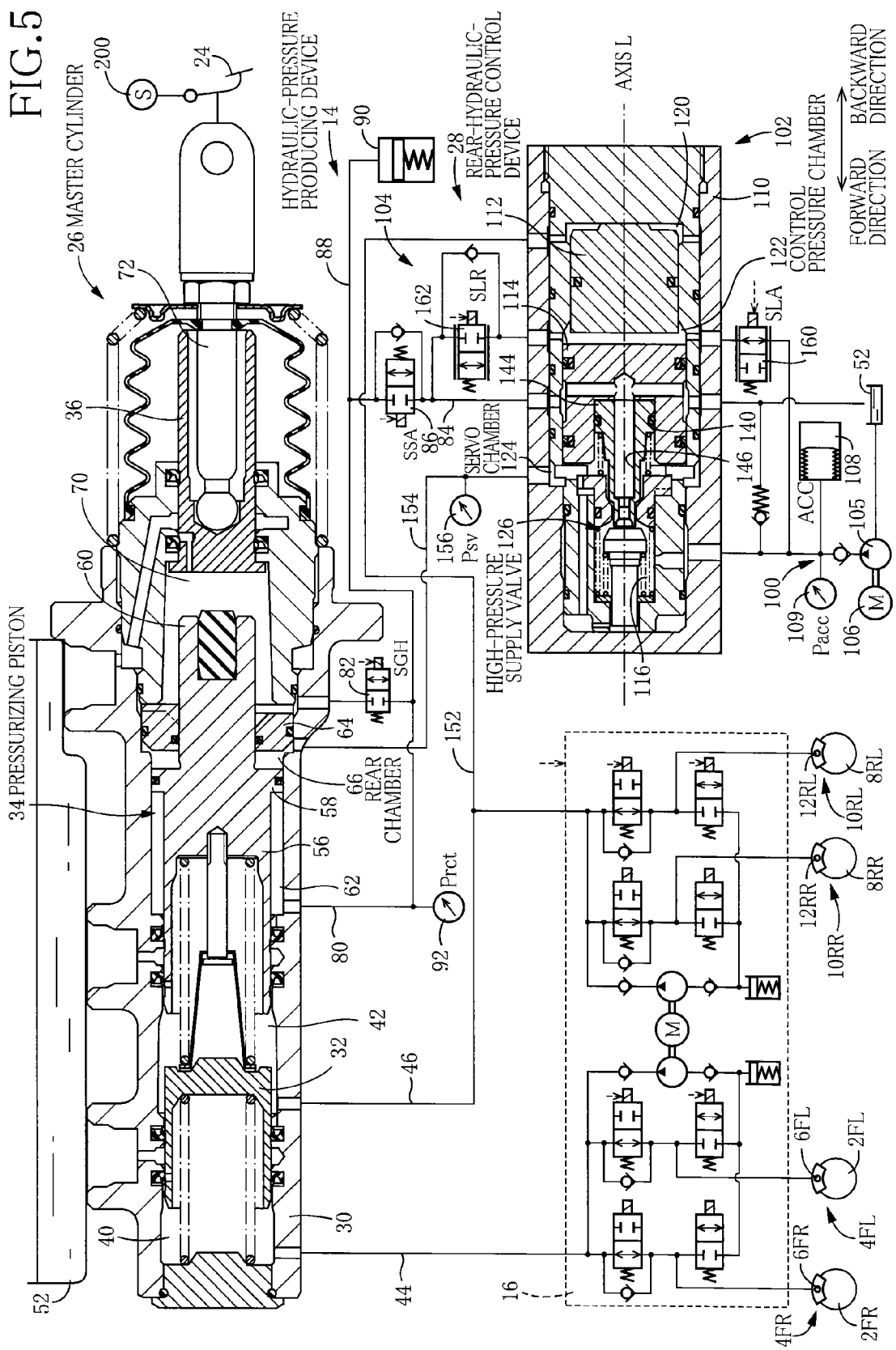

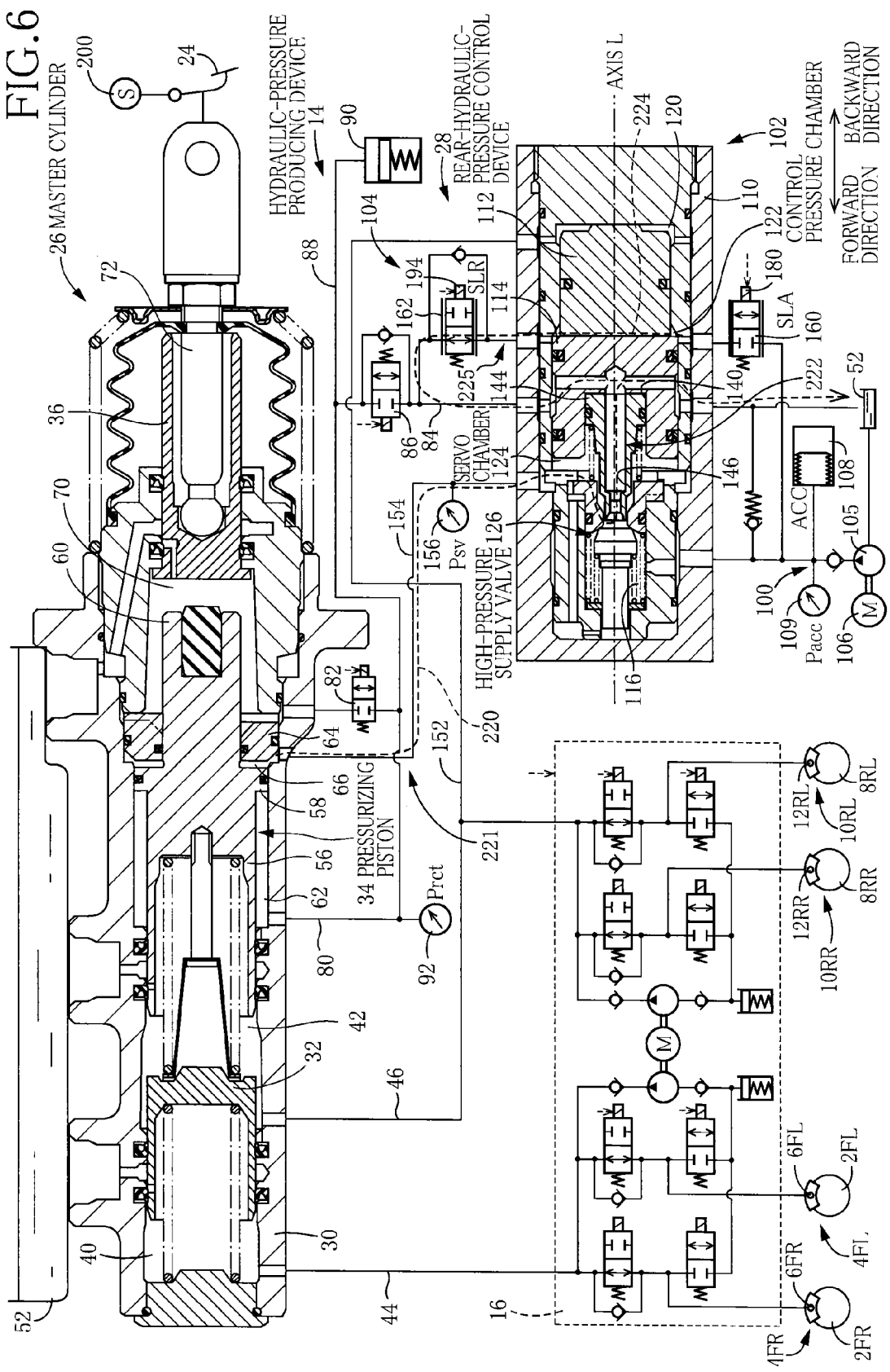

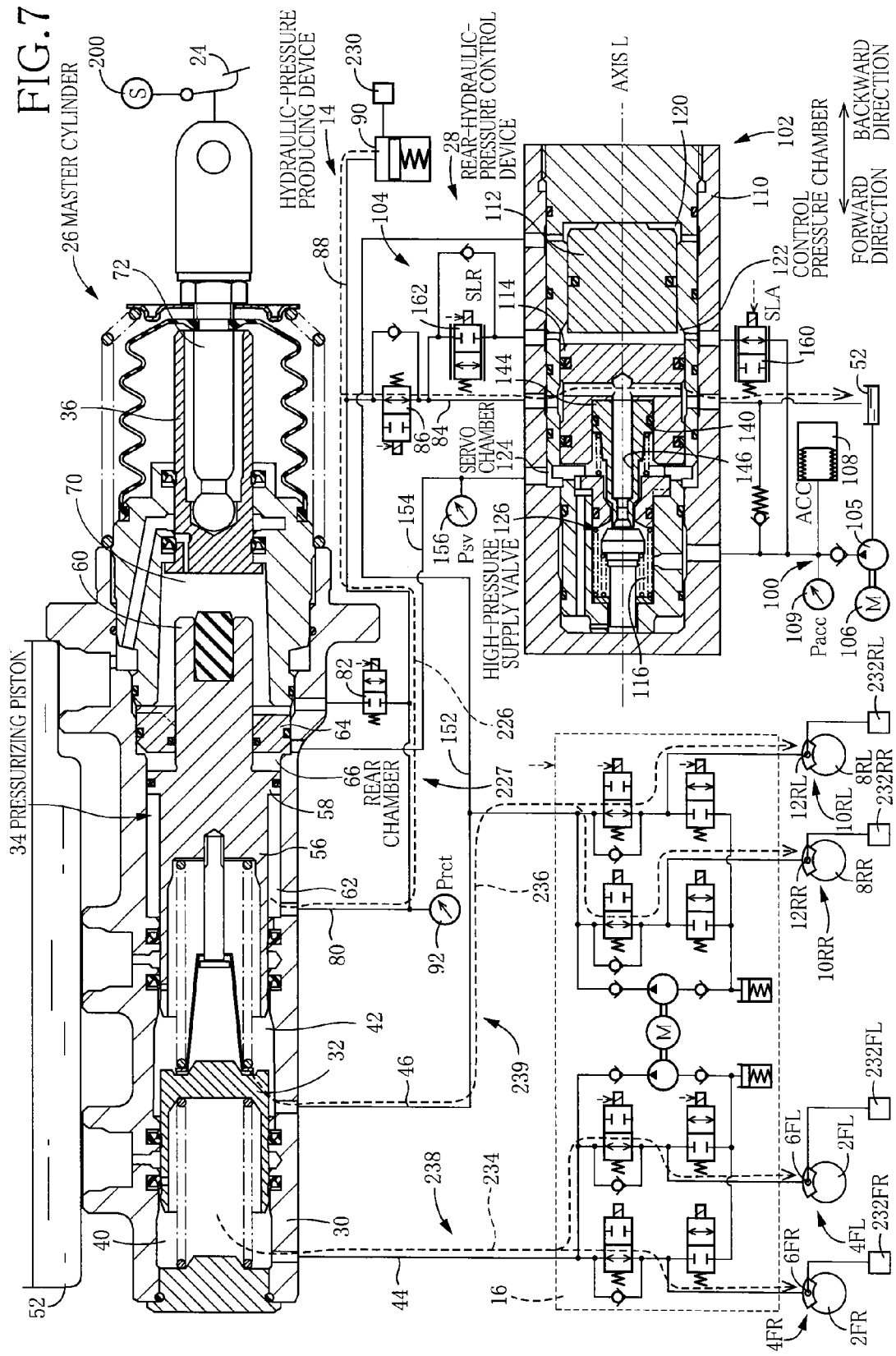

HYDRAULIC BRAKE SYSTEM

CROSS REFERENCE TO RELATED APPLICATION

The present application claims priority from Japanese Patent Application No. 2013-264740, which was filed on Dec. 23, 2013, the disclosure of which is herein incorporated by reference in its entirety.

BACKGROUND OF THE INVENTION

Field of the Invention

The present invention relates to air reduction in a hydraulic brake system.

Description of the Related Art

Patent Document 1 (Japanese Patent Application Publication No. 2007-186140) discloses a hydraulic brake system including (a) a master cylinder, (b) a brake cylinder, (c) a hydraulic-pressure control device capable of controlling a hydraulic pressure in the brake cylinder, and (d) an air bleeding device configured to bleed air out of the hydraulic-pressure control device. The hydraulic-pressure control device includes (i) a pump device, (ii) a reservoir, and (iii) a plurality of electromagnetic valves respectively provided between the pump device and a brake cylinder and between the reservoir and the brake cylinder. The air bleeding device actuates the pump device and opens at least one of the electromagnetic valves, whereby working fluid discharged from the pump device is supplied to an air bleeding target portion in the hydraulic-pressure control device and then discharged to the reservoir. Thus, air bleeding is performed for the air bleeding target portion. Also, the air bleeding device closes an electromagnetic valve provided between the master cylinder and the brake cylinder and actuates the pump device. Meanwhile, an operator opens a bleeder plug provided on the brake cylinder. Thus, air bleeding is performed for an air bleeding target portion (which is located downstream of the electromagnetic valve).

SUMMARY OF THE INVENTION

This invention has been developed to provide a hydraulic brake system configured to perform air reduction with a configuration that differs from a configuration provided for air bleeding disclosed in Patent Document 1.

The present invention provides a hydraulic brake system comprising: a brake hydraulic-pressure control device capable of controlling a hydraulic pressure in a brake cylinder and comprising (i) a piston, (ii) a hydraulic-pressure chamber provided opposite the piston, and (iii) a moving-force control device configured to apply a moving force to the piston and capable of controlling the moving force; and an air reducing device configured to control the moving-force control device to move the piston to reduce air in an air reduction target portion of the brake hydraulic-pressure control device.

The movement of the piston by the air reducing device causes air in the air reduction target portion to be bled together with the working fluid, resulting in reduced amount of air.

Thus, in the hydraulic brake system according to the present invention, the movement of the piston is utilized to reduce air in the air reduction target portion. That is, air is reduced with a configuration that differs from a configuration for air bleeding disclosed in Patent Document 1.

FORMS OF THE INVENTION

There will be described by way of examples inventions recognized to be claimable by the present applicant or features of the inventions.

(1) A hydraulic brake system, comprising:

a brake cylinder of a hydraulic brake configured to reduce a rotation of a wheel;

a master cylinder comprising (a) a first housing, (b) a pressurizing piston fluid-tightly and slidably fitted in the first housing, (c) a pressure chamber provided in front of the pressurizing piston and connected to the brake cylinder, and (d) a rear chamber provided at a rear of the pressurizing piston;

a rear-hydraulic-pressure control device comprising (i) a second housing, (ii) a control piston fluid-tightly and slidably fitted in the second housing, (iii) an output chamber provided opposite the control piston, (iv) a control-piston moving-force control device configured to apply a moving force to the control piston and capable of controlling the moving force, the rear-hydraulic-pressure control device being configured to supply a hydraulic pressure in the output chamber to the rear chamber; and an air reducing device comprising a second air reducing device configured to, by controlling the control-piston moving-force control device, move the control piston and establish communication between the output chamber and a low pressure source to reduce air in a second air reduction target portion comprising the output chamber.

The rear-hydraulic-pressure control device controls the hydraulic pressure in the output chamber by controlling the moving force applied to the control piston, and the controlled hydraulic pressure in the output chamber is supplied to the rear chamber. In the master cylinder, a hydraulic pressure in the rear chamber advances the pressurizing piston, so that a hydraulic pressure is generated in the pressure chamber and supplied to the brake cylinder. A hydraulic pressure in the brake cylinder is controlled by the control of the moving force by the rear-hydraulic-pressure control device.

For example, this hydraulic brake system may be configured such that the control piston is moved by the air reducing device to increase the hydraulic pressure in the output chamber, and thereafter the output chamber is fluidically coupled with the low pressure source. Air in the output chamber is bled together with the working fluid into the low pressure source, thereby reducing the air in the second air reduction target portion. The low pressure source may be either of the reservoir and the atmosphere.

Examples of the moving force applied to the control piston include a force related to the hydraulic pressure and an electromagnetic driving force. Examples of the control-piston moving-force control device include: a device including an electromagnetic valve capable of controlling the hydraulic pressure; and a device including an electric motor capable of outputting a pressing force (i.e., an electromagnetic driving force) determined by, e.g., a supply current. Also, the first housing and the second housing may be independent of each other and may be provided by the same housing, in other words, the first housing and the second housing may not be independent of each other.

(2) The hydraulic brake system according to the above form (1), wherein the rear-hydraulic-pressure control device comprises a communication/isolation mechanism provided between the output chamber and the low pressure source, and a state of the communication/isolation mechanism is switchable between a communicating state in which the output chamber and the low pressure source communicate with each other and an isolated state in which the output chamber and the low pressure source are isolated from each other, and wherein the air reducing device comprises (i) a control-piston moving device configured to control the control-piston moving-force control device to move the control piston and (ii) a low-pressure-source communication switching device configured to switch the state of the communication/isolation mechanism from the isolated state to the communicating state.

The communication/isolation mechanism may be either of an electromagnetic valve and a mechanical valve. For example, the communication/isolation mechanism may be configured to switch between the communicating state and the isolated state with the movement of the control piston.

(3) The hydraulic brake system according to the above form (1) or (2), wherein the control-piston moving-force control device comprises a hydraulic-pressure-based moving-force control device capable of controlling the moving force by controlling a hydraulic pressure in a control pressure chamber provided on an opposite side of the control piston from the output chamber, and wherein the air reducing device is configured to control the hydraulic-pressure-based moving-force control device to move the control piston.

(4) The hydraulic brake system according to the above form (2), wherein the control-piston moving-force control device comprises (i) a control pressure chamber provided on an opposite side of the control piston from the output chamber, (ii) a pressure increase valve provided between the control pressure chamber and a high pressure source, and (iii) a pressure reduction valve provided between the control pressure chamber and the low pressure source, and wherein the control-piston moving device is configured to control the pressure increase valve and the pressure reduction valve to move the control piston.

Each of the pressure increase valve and the pressure reduction valve may be an electromagnetic open/close valve which is opened and closed by the presence and absence (ON/OFF) of the supply current and may be a linear valve which is actuated according to the magnitude of the supply current. The control-piston moving device may be configured to switch each of the pressure increase valve and the pressure reduction valve to the open state and the closed state a plurality of times to reciprocate the control piston a plurality of times. The air in the second air reduction target portion can be reliably reduced by reciprocating the control piston a plurality of times.

(5) The hydraulic brake system according to the above form (4), wherein the second air reducing device is configured to reduce air in the second air reduction target portion by establishing an open state of the pressure increase valve and a closed state of the pressure reduction valve to cause movement of the control piston to isolate the output chamber from the low pressure source to increase the hydraulic pressure in the output chamber and thereafter establishing an open state of the pressure reduction valve to move the control piston in a direction opposite from a direction of the movement to establish communication between the output chamber and the low pressure source.

While the pressure reduction valve is opened after the increase in the hydraulic pressure in the output chamber, the pressure increase valve may be in the closed state or the open state.

(6) The hydraulic brake system according to the above form (4) or (5), wherein the air reducing device further comprises a third air reducing device configured to reduce air in a third air reduction target portion comprising the control pressure chamber, by establishing an open state of the pressure increase valve and a closed state of the pressure reduction valve to increase a hydraulic pressure in the control pressure chamber and thereafter establishing an open state of the pressure reduction valve to establish communication between the control pressure chamber and the low pressure source.

Air in the control pressure chamber is bled together with the working fluid into the low pressure source via the pressure reduction valve. Also, a reduction of the hydraulic pressure in the control pressure chamber moves the control piston in a direction in which the volume of the control pressure chamber decreases. This configuration enables reliable bleeding of the air out of the control pressure chamber.

(7) The hydraulic brake system according to any one of the above forms (4) through (6), wherein the high pressure source comprises an accumulator configured to accumulate working fluid in a pressurized state.

It is noted that the working fluid accumulated in the accumulator may not be used in the air reduction, and the working fluid discharged from the pump may be used.

(8) The hydraulic brake system according to any one of the above forms (1) through (7), wherein the air reducing device comprises a fourth air reducing device configured to control the rear-hydraulic-pressure control device to reduce air in a fourth air reduction target portion comprising the rear chamber.

(9) The hydraulic brake system according to the above form (8), wherein the fourth air reducing device is configured to, by controlling the control-piston moving-force control device to move the control piston, increase the hydraulic pressure in the output chamber to increase a hydraulic pressure in the rear chamber and thereafter establish communication between the rear chamber and the low pressure source.

Air in the rear chamber is bled into the low pressure source together with the working fluid. Also, the increase in the hydraulic pressure in the rear chamber advances the pressurizing piston, and the communication between the rear chamber and the low pressure source retracts the pressurizing piston. The retraction of the pressurizing piston, i.e., the movement of the pressurizing piston in the direction in which the volume of the rear chamber decreases can reliably bleed the air out of the rear chamber.

(10) The hydraulic brake system according to any one of the above forms (1) through (9), wherein the air reducing device further comprises a first air reducing device configured to control the rear-hydraulic-pressure control device to advance the pressurizing piston to reduce air in the first air reduction target portion comprising the pressure chamber.

For example, the hydraulic brake system may be configured such that the pressurizing piston is advanced to increase a hydraulic pressure in the pressure chamber, and thereafter the pressure chamber is fluidically coupled with the low pressure source. Also, the hydraulic brake system may be configured such that a bleeder plug provided downstream of the pressure chamber is opened by an operator and may be configured such that an electromagnetic valve or the like provided between the pressure chamber and the low pressure source is opened by the first air reducing device.

Also, the pressurizing piston may be advanced in the state in which the pressure chamber and the low pressure source communicate with each other. The advance of the pressurizing piston, i.e., the movement of the pressurizing piston in a direction in which the volume of the pressure chamber decreases can reliably bleed the air out of the pressure chamber.

(11) The hydraulic brake system according to any one of the above forms (1) through (10), wherein the pressurizing piston comprises a first piston portion and a second piston portion, wherein the pressure chamber is provided in front of the first piston portion, wherein the master cylinder is provided in front of the second piston portion and comprises a reaction force chamber independent of the pressure chamber, and wherein the air reducing device further comprises a fifth air reducing device configured to control the rear-hydraulic-pressure control device to reduce air in a fifth air reduction target portion comprising the reaction force chamber.

(12) The hydraulic brake system according to the above form (11), wherein the fifth air reducing device is configured to control the control-piston moving-force control device to advance the pressurizing piston and to establish communication between the reaction force chamber and the low pressure source.

A stroke simulator is connected to the reaction force chamber, and the working fluid in the reaction force chamber is supplied to the stroke simulator with the advance of the pressurizing piston. By fluidically coupling the reaction force chamber with the low pressure source, air in the reaction force chamber is bled into the low pressure source together with the working fluid. Also, the advance of the pressurizing piston, i.e., the movement of the pressurizing piston in a direction in which the volume of the reaction force chamber decreases can reliably bleed the air out of the reaction force chamber.

In a case where a bleeder plug is provided on, e.g., the stroke simulator, the operator can open the bleeder plug to establish the communication between the reaction force chamber and the low pressure source. Also, the pressurizing piston may be advanced in the state in which the reaction force chamber and the low pressure source communicate with each other.

(13) The hydraulic brake system according to any one of the above forms (1) through (12), the air reducing device is configured to reduce the air in response to an air reduction command.

The air reduction command may be produced in the hydraulic brake system and may be produced in an external device outside the hydraulic brake system.

(14) A hydraulic brake system, comprising:
a brake cylinder of a hydraulic brake configured to reduce a rotation of a wheel;
a master cylinder comprising (a) a first housing, (b) a pressurizing piston fluid-tightly and slidably fitted in the first housing, and (c) a pressure chamber provided in front of the pressurizing piston and connected to the brake cylinder;
a pressurizing-piston moving-force control device configured to apply a moving force to the pressurizing piston and capable of controlling the moving force; and
an air reducing device comprising a first air reducing device configured to control the pressurizing-piston moving-force control device to advance the pressurizing piston to reduce air in a first air reduction target portion comprising the pressure chamber.

The hydraulic brake system in the present form can adopt any of the technical features in the forms (1) through (13).

The pressurizing-piston moving-force control device may be the rear-hydraulic-pressure control device according to any one of the forms (1) through (13).

(15) A hydraulic brake system comprising:
a brake cylinder of a hydraulic brake configured to reduce a rotation of a wheel;
a master cylinder comprising (a) a first housing, (b) a pressurizing piston fluid-tightly and slidably fitted in the first housing, (c) a pressure chamber provided in front of the pressurizing piston and connected to the brake cylinder, and (d) a rear chamber provided at a rear of the pressurizing piston;
a rear-hydraulic-pressure control device comprising (i) a second housing, (ii) a control piston fluid-tightly and slidably fitted in the second housing, (iii) an output chamber provided opposite the control piston, and (iv) a control-piston moving-force control device configured to apply a moving force to the control piston and capable of controlling the moving force, the rear-hydraulic-pressure control device being configured to supply a hydraulic pressure in the output chamber to the rear chamber; and
an air reducing device configured to control the control-piston moving-force control device to move the control piston to reduce air in an air reduction target portion of a hydraulic-pressure producing device, the air reduction target portion comprising the master cylinder and the rear-hydraulic-pressure control device.

The hydraulic brake system in the present form can adopt any one of the technical features in the forms (1) through (14).

(16) A hydraulic brake system, comprising:
a brake cylinder of a hydraulic brake configured to reduce a rotation of a wheel;
a master cylinder comprising (a) a housing, (b) a pressurizing piston fluid-tightly and slidably fitted in the housing, (c) a pressure chamber provided in front of the pressurizing piston and connected to the brake cylinder, and (d) a rear chamber provided at a rear of the pressurizing piston;
a rear-hydraulic-pressure control device capable of controlling a hydraulic pressure in the rear chamber; and
an air reducing device configured to control the rear-hydraulic-pressure control device to reduce air in an air reduction target portion comprising the rear chamber.

The hydraulic brake system in the present form can adopt any of the technical features in the forms (1) through (15).

(17) A hydraulic brake system, comprising:
a brake cylinder of a hydraulic brake configured to reduce a rotation of a wheel;
a master cylinder comprising (a) a housing, (b) a pressurizing piston fluid-tightly and slidably fitted in the housing and comprising a first piston portion and a second piston portion, (c) a pressure chamber provided in front of the first piston portion and connected to the brake cylinder, and (d) a reaction force chamber provided in front of the second piston portion and independent of the pressure chamber;
a pressurizing-piston moving-force control device configured to apply a moving force to the pressurizing piston and capable of controlling the moving force; and
an air reducing device configured to control the pressurizing-piston moving-force control device to reduce air in an air reduction target portion comprising the reaction force chamber.

The hydraulic brake system in the present form can adopt any of the technical features in the forms (1) through (16).

(18) A hydraulic brake system, comprising:

a brake cylinder of a hydraulic brake configured to reduce a rotation of a wheel;

a master cylinder comprising (a) a first housing, (b) a pressurizing piston fluid-tightly and slidably fitted in the first housing, (c) a pressure chamber provided in front of the pressurizing piston and connected to the brake cylinder, and (d) a rear chamber provided at a rear of the pressurizing piston;

a rear-hydraulic-pressure control device comprising (i) a second housing, (ii) a control piston fluid-tightly and slidably fitted in the second housing, (iii) an output chamber provided opposite the control piston, (iv) a control-piston moving-force control device configured to apply a moving force to the control piston and capable of controlling the moving force, the rear-hydraulic-pressure control device being configured to supply a hydraulic pressure in the output chamber to the rear chamber; and an air reducing device configured to control the control-piston moving-force control device to reduce air in an air reduction target portion comprising the output chamber.

The hydraulic brake system in the present form can adopt any of the technical features in the forms (1) through (17).

(19) An air reducing device configured to reduce air in an air reduction target portion of a hydraulic brake system, the hydraulic brake system comprising (A) a brake cylinder of a hydraulic brake configured to reduce a rotation of a wheel and (B) a brake hydraulic-pressure control device capable of controlling a hydraulic pressure in the brake cylinder and comprising (i) a housing, (ii) a piston fluid-tightly and slidably fitted in the housing, (iii) a hydraulic-pressure chamber provided in front of the piston, and (iv) a moving-force control device configured to apply a moving force to the piston and capable of controlling the moving force, the brake hydraulic-pressure control device being configured to supply a hydraulic pressure in the hydraulic-pressure chamber to the brake cylinder, the air reducing device comprising a piston moving device configured to control the moving-force control device to move the piston to reduce air in the air reduction target portion.

The air reducing device may be provided in the hydraulic brake system and may be provided in an external device which differs from the hydraulic brake system. For example, the air reducing device may be provided in equipment installed in an inspection factory, for example. Also, the hydraulic pressure in the hydraulic-pressure chamber may be supplied directly to the brake cylinder and may be supplied to the brake cylinder via a hydraulic-pressure actuating mechanism, for example.

The air reducing device in the present form can adopt any of the technical features in the forms (1) through (18).

(20) An air reduction method of reducing air in an air reduction target portion of a hydraulic brake system, the hydraulic brake system comprising (A) a brake cylinder of a hydraulic brake configured to reduce a rotation of a wheel and (B) a brake hydraulic-pressure control device capable of controlling a hydraulic pressure in the brake cylinder and comprising (i) a housing, (ii) a piston fluid-tightly and slidably fitted in the housing, (iii) a hydraulic-pressure chamber provided in front of the piston, and (iv) a moving-force control device configured to apply a moving force to the piston and capable of controlling the moving force, the brake hydraulic-pressure control device being configured to supply a hydraulic pressure in the hydraulic-pressure chamber to the brake cylinder, the air reduction method comprising controlling the moving-force control device to move the piston to reduce air in the air reduction target portion.

The air reducing method in the present form can adopt any of the technical features in the forms (1) through (19).

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIG. 5 is a circuit diagram illustrating an air reduction state (a state (1)) in the hydraulic brake system;

FIG. 6 is a circuit diagram illustrating a state different from the air reduction state (a state (2)(a)); and FIG. 7 is a circuit diagram illustrating another state different from the air reduction state (a state (2)(b), (c)).

DETAILED DESCRIPTION OF THE EMBODIMENT

Figure 1:
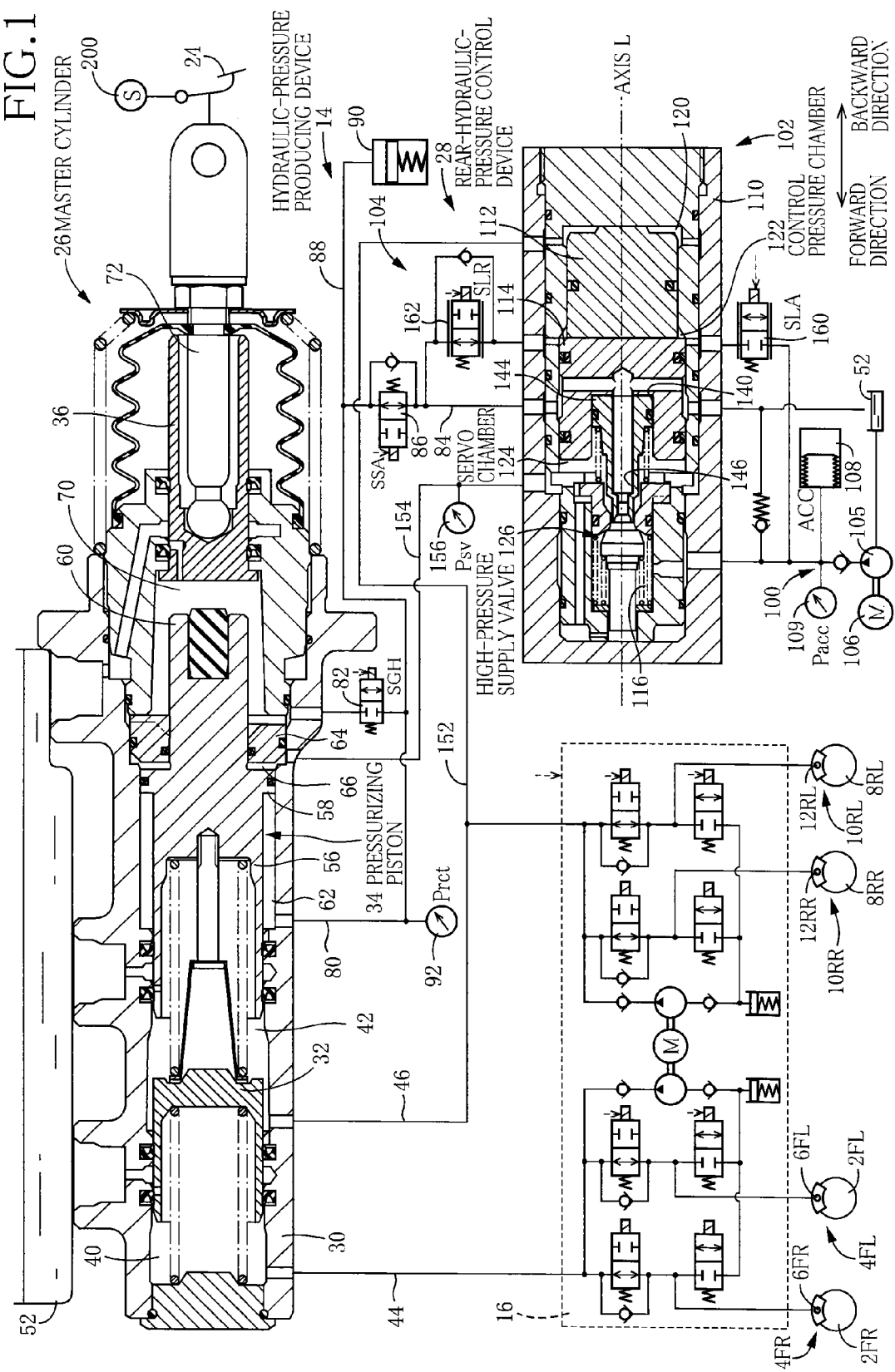
FIG. 1 is a circuit diagram illustrating a hydraulic brake system according to one embodiment of the present invention.

Hereinafter, there will be described a hydraulic brake system according to one embodiment of the present invention by reference to the drawings. While air is reduced in the present hydraulic brake system, this air reduction is usually performed in a vehicle factory or an inspection place, for example.

Configuration of Hydraulic Brake System

The hydraulic brake system includes (i) brake cylinders 6FL, 6FR of hydraulic brakes 4FL, 4FR respectively provided for front left and right wheels 2FL, 2FR, and brake cylinders 12RL, 12RR of hydraulic brakes 10RL, 10RR respectively provided for rear left and right wheels 8RL, 8RR, (ii) a hydraulic-pressure producing device 14 capable of supplying hydraulic pressures to these brake cylinders 6FL, 6FR, 12RL, 12RR, and (iii) a slip control device provided between the hydraulic-pressure producing device 14 and the brake cylinders 6FL, 6FR, 12RL, 12RR. Devices such as the hydraulic-pressure producing device 14 and the slip control device 16 are controlled by a brake ECU 20 (see FIG. 2). In the following description, each of components such as the hydraulic brakes will be referred with a corresponding one of suffixes (FL, FR, RL, RR) indicative of the respective front left, front right, rear left, and rear right wheels where these components should be distinguished by their respective wheel positions or where the components are collectively referred, for example.

Hydraulic-Pressure Producing Device

The hydraulic-pressure producing device 14 includes (i) a brake pedal 24 as a brake operating member, (ii) a master cylinder 26, (iii) a rear-hydraulic-pressure control device 28 configured to control a hydraulic pressure in a rear chamber of the master cylinder 26.

Master Cylinder

The master cylinder 26 includes (a) a housing 30 as a first housing, (b) pressurizing pistons 32, 34 and an input piston 36 arranged in a row and fluid-tightly and slidably fitted in a cylinder bore formed in the housing 30.

Pressure chambers 40, 42 are defined in front of the respective pressurizing pistons 32, 34. The brake cylinders 6 for the front left and right wheels 2 are connected to the pressure chamber 40 by a fluid passage 44, while the brake cylinders 12 for the respective rear left and right wheels 8 are connected to the pressure chamber 42 by a fluid passage 46. When the hydraulic pressure is supplied to the brake cylinders 6, 12, each of the hydraulic brakes 4, 10 is actuated to reduce an amount of rotation of a corresponding one of the wheels 2, 8. Elastic forces are applied to the pressurizing pistons 32, 34 in a back direction by return springs, and when each of the pressurizing pistons 32, 34 is located at its back end position, the pressure chambers 40, 42 communicate with a reservoir 52.

The pressurizing piston 34 includes (a) a front piston portion 56, as a first piston portion, provided in a front portion thereof, (b) an intermediate piston portion 58, as a second piston portion, provided in an intermediate portion of the pressurizing piston 34 so as to project in its radial direction, and (c) a rear small-diameter portion 60 provided in a rear portion of the pressurizing piston 34 and having a smaller diameter than the intermediate piston portion 58. The front piston portion 56 and the intermediate piston portion 58 are fluid-tightly and slidably fitted in the housing 30. A space in front of the front piston portion 56 is the pressure chamber 42, and a space in front of the intermediate piston portion 58 is an annular reaction force chamber 62. The rear small-diameter portion 60 provided at a rear of the intermediate piston portion 58 is fluid-tightly and slidably fitted in an annular inner-circumferential-side protruding portion 64 provided in the housing 30. This construction forms a rear chamber 66 at a rear of the intermediate piston portion 58.

The input piston 36 is located at a rear of the pressurizing piston 34, and an input chamber 70 is defined between the rear small-diameter portion 60 and the input piston 36. The brake pedal 24 is engaged with a rear portion of the input piston 36 by an operating rod 72 and other components. With the input piston 36 being located at its back end position, the input chamber 70 communicates with the reservoir 52.

The reaction force chamber 62 and the input chamber 70 are connected by a passage 80. A normally-closed communication control valve (SGH) 82 is provided in the passage 80. A portion of the passage 80 which is located on one of opposite sides of the communication control valve 82 which is nearer to the reaction force chamber 62 is connected to the reservoir 52 by a reservoir passage 84 and connected to a stroke simulator 90 by a simulator passage 88. A normally-open reservoir cut-off valve (SSA) 86 is provided in the reservoir passage 84. An operation hydraulic sensor 92 is provided in a portion of the passage 80 which is located on one of opposite sides of its portion connected to the reservoir passage 84 and the simulator passage 88, which one is nearer to the reaction force chamber 62.

Rear-hydraulic-pressure Control Device

The rear-hydraulic pressure control device 28 is connected to the rear chamber 66.

The rear-hydraulic pressure control device 28 includes (a) a high pressure source 100, (b) a regulator 102, and (c) a linear valve device 104.

The high pressure source 100 includes: a pump device including a pump 105 and a pump motor 106; and an accumulator 108 configured to accumulate working fluid or brake fluid ejected from the pump device in a pressurized state. A hydraulic pressure of the working fluid accumulated in the accumulator 108 is called an accumulator pressure which is detected by an accumulator pressure sensor 109. The pump motor 106 is controlled so as to keep the accumulator pressure within a predetermined range.

The regulator 102 includes a housing 110 as a second housing, and a pilot piston 112 and a control piston 114 provided in the housing 110 so as to be arranged in a row in a direction parallel to an axis L. The housing 110 has a stepped cylinder bore which includes: a large diameter portion in which the pilot piston 112 and the control piston 114 are fluid-tightly and slidably fitted; and a small diameter portion having a high pressure chamber 116 connected to the high pressure source 100. A space defined at a rear of the pilot piston 112 is a pilot pressure chamber 120. A space defined at a rear of the control piston 114 is a control pressure chamber 122, and a space defined in front of the control piston 114 is a servo chamber 124.

A normally-closed high-pressure supply valve 126 is provided between the servo chamber 124 and the high pressure chamber 116.

The control piston 114 includes: a mating hole 140 always communicating with the reservoir 52; and a valve member 144 fitted in the mating hole 140. The valve member 144 has an axial direction passage 146 communicating with the mating hole 140 (the reservoir 52). The valve member 144 switches between a state in which the reservoir 52 and the servo chamber 124 are isolated from each other and a state in which the reservoir 52 and the servo chamber 124 communicate with each other. An elastic force is applied to the control piston 114 (including the valve member 144) by a spring in the back direction, and when the control piston 114 is located at the back end position, the servo chamber 124 and the reservoir 52 communicate with each other.

The pilot pressure chamber 120 is connected to the fluid passage 46 by a pilot passage 152. Thus, a hydraulic pressure in the pressure chamber 42 of the master cylinder 26 acts on the pilot piston 112.

The rear chamber 66 of the master cylinder 26 is connected to the servo chamber 124 by a servo passage 154. Since the servo chamber 124 and the rear chamber 66 are directly connected to each other, a hydraulic pressure in the servo chamber 124 and a hydraulic pressure in the rear chamber 66 are principally equal to each other. It is noted that a servo-hydraulic-pressure sensor 156 is provided in the servo passage 154 to detect a servo hydraulic pressure which is the hydraulic pressure in the servo chamber 124.

The linear valve device 104 includes: a pressure-increasing linear valve 160 as one example of a pressure increase valve provided between the control pressure chamber 122 and the high pressure source 100; and a pressure-reduction linear valve 162 as one example of a pressure reduction valve provided between the control pressure chamber 122 and the reservoir 52. The pressure-increasing linear valve 160 is a normally closed valve, and the pressure-reduction linear valve 162 is a normally open valve.

Slip Control Device

The slip control device 16 includes a plurality of electromagnetic open/close valves. The plurality of electromagnetic open/close valves are individually opened and closed, whereby the hydraulic pressures in the respective brake cylinders 6, 12 are individually controlled.

Brake ECU

Figure 2:
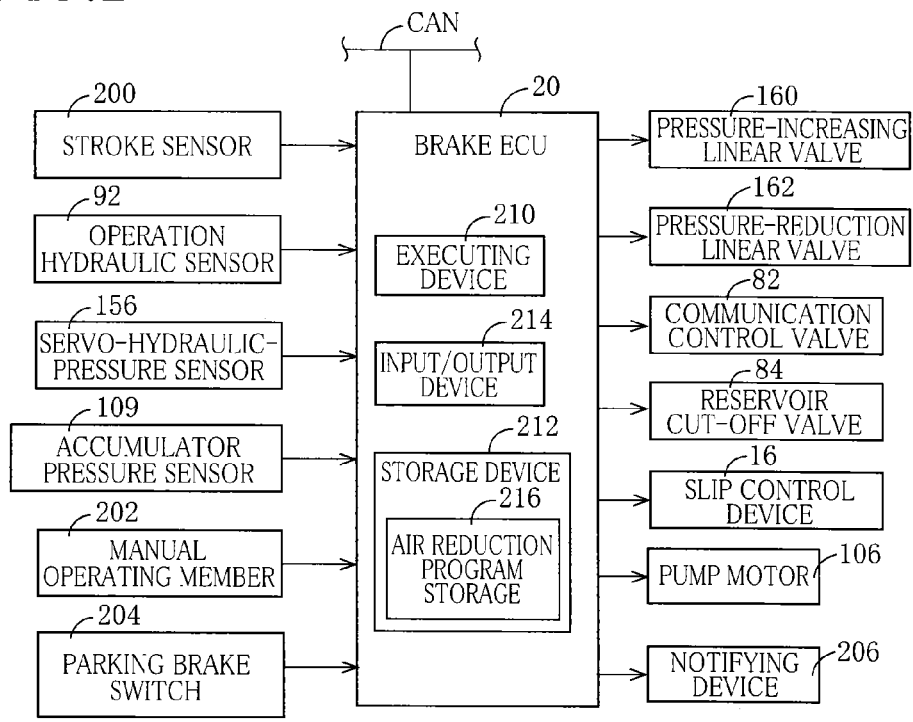
FIG. 2 is a view illustrating a brake ECU and devices connected thereto in the hydraulic brake system.

As illustrated in FIG. 2, devices connected to the brake ECU 20 include: the operation hydraulic sensor 92; the accumulator pressure sensor 109; the servo-hydraulic-pressure sensor 156; a stroke sensor 200 configured to detect a stroke of the brake pedal 24; a manual operating member 202; a parking brake switch 204; coils of electromagnetic valves such as the communication control valve 82, the reservoir cut-off valve 86, the pressure-increasing linear valve 160, and the pressure-reduction linear valve 162; the pump motor 106; and a notifying device 206 including a display. The notifying device 206 provides information and the like about air reduction. It is noted that not only the parking brake switch 204 but also various sensors such as a shift position sensor and a wheel speed sensor may be connected to the brake ECU 20. Any configuration may be employed as long as the brake ECU 20 can recognize, based on detection values and the like, whether a vehicle is stopped or not.

The brake ECU 20 is principally constituted by a computer including an executing device 210, a storage device 212, and an input/output device 214. The storage device 212 includes an air reduction program storage 216 which stores information such as an air reduction program illustrated in the flow chart in FIG. 3.

Operations of Hydraulic Brake System

Normal Control

When there is no request for actuating the hydraulic brakes 4, 10, the pressure-increasing linear valve 160 is closed, and the pressure-reduction linear valve 162 is open. The control pressure chamber 122 communicates with the reservoir 52, and the control piston 114 is located at its back end position. The servo chamber 124 communicates with the reservoir 52, so that no hydraulic pressure is supplied to the rear chamber 66. In the master cylinder 26, the pressurizing piston 34 is located at its back end position, and no hydraulic pressure is generated in the pressure chambers 40, 42. No hydraulic pressure is supplied to the brake cylinders 6, 12, so that the hydraulic brakes 4, 10 are not working.

When the brake pedal 24 is depressed, that is, the hydraulic brakes 4, 10 are requested to be actuated, the communication control valve 82 is opened, the reservoir cut-off valve 86 is closed, the pressure-increasing linear valve 160 is opened, and the pressure-reduction linear valve 162 is closed. The hydraulic pressure in the control pressure chamber 122 is increased, and thereby the control piston 114 is moved forward. As a result, the axial direction passage 146 is interrupted, the high-pressure supply valve 126 is opened, and the servo chamber 124 is isolated from the reservoir 52 and fluidically coupled with the high pressure chamber 116. The servo hydraulic pressure is consequently increased and supplied to the rear chamber 66. In the master cylinder 26, the hydraulic pressure in the rear chamber 66 moves the pressurizing piston 34 forward, so that the hydraulic pressures in the respective pressure chambers 40, 42 are increased. The hydraulic pressure is supplied to the brake cylinders 6, 12, which causes the hydraulic brakes 4, 10 to work. The hydraulic pressures in the respective brake cylinders 6, 12 are controlled by control of the pressure-increasing linear valve 160 and the pressure-reduction linear valve 162.

Air Reduction

In the present embodiment, opening and closing of the pressure-increasing linear valve 160 and the pressure-reduction linear valve 162 move the control piston 114 and the pressurizing pistons 32, 34, whereby air and the working fluid are released from the control pressure chamber 122, the servo chamber 124, the rear chamber 66, the pressure chambers 40, 42, the reaction force chamber 62, and the like, resulting in reduction of an amount of air in these chambers.

(1) Pressurized State (Forward Movement of Pressurizing Pistons 32, 34 and Control Piston 114)

As illustrated in FIG. 5, the communication control valve 82 is closed, the reservoir cut-off valve 86 is closed, the pressure-increasing linear valve 160 is open, and the pressure-reduction linear valve 162 is closed. A hydraulic pressure in the accumulator 108 increases the hydraulic pressure in the control pressure chamber 122, which moves the control piston 114 forward. The servo chamber 124 is isolated from the reservoir 52, so that the hydraulic pressure in the servo chamber 124 is increased, and the hydraulic pressure in the rear chamber 66 is increased, which moves the pressurizing pistons 34, 32 forward. The hydraulic pressures in the respective pressure chambers 40, 42 are increased, so that the hydraulic pressure is supplied to the brake cylinders 6, 12. A hydraulic pressure in the reaction force chamber 62 is also increased, which supplies the hydraulic pressure to the stroke simulator 90. In the present embodiment, this state may be hereinafter referred to as "pressurized state" and "piston advancing state".

It is noted that the hydraulic pressure in the accumulator 108 may not be used to increase the hydraulic pressure in the control pressure chamber 122, and other methods may be used. For example, the pump motor 106 may be driven to increase the hydraulic pressure in the control pressure chamber 122 by utilizing a pressure of ejection of the pump 105.

(2) Communication of Air Reduction Target Portion with Low Pressure Source

After the establishment of the pressurized state, an air reduction target portion or portions are fluidically coupled with the reservoir 52 or the atmosphere.

(a) Air Reduction for Servo Chamber 124, Rear Chamber 66, Control Pressure Chamber 122, and so on As illustrated in FIG. 6, the pressure-reduction linear valve 162 is open, and the pressure-increasing linear valve 160 is closed. The hydraulic pressure in the control pressure chamber 122 is lowered, which moves the control piston 114 backward.

(a-1) A communicating state of the axial direction passage 146 is established, so that the servo chamber 124 communicates with the reservoir 52. The hydraulic pressure in the servo chamber 124 is lowered, and the hydraulic pressure in the rear chamber 66 is lowered, which moves the pressurizing pistons 34, 32 backward. The rear chamber 66 is fluidically coupled with the reservoir 52 via the servo chamber 124. The air in the rear chamber 66 is bled together with the working fluid along a path 220 into the servo chamber 124 via the servo passage 154. The air in the servo chamber 124 is bled together with the working fluid into the reservoir 52 via the axial direction passage 146 and the reservoir passage 84. This operation reduces an amount of air in an air reduction target portion 221 including the rear chamber 66 and the servo passage 154 and in an air reduction target portion 222 including the servo chamber 124, the axial direction passage 146, and the reservoir passage 84.

In the present embodiment, since the servo chamber 124 and the rear chamber 66 are fluidically coupled with the reservoir 52 in a state in which the hydraulic pressures in the servo chamber 124 and the rear chamber 66 are high, air in the servo chamber 124 and the rear chamber 66 is compressed and then bled together with the working fluid into the reservoir 52. Since the air is bled in a state in which a pressure difference is large, air in the servo chamber 124, the rear chamber 66, and so on can be reliably discharged. The air in the rear chamber 66 can also be reliably discharged by the backward movement of the pressurizing piston 34, i.e., a movement of the pressurizing piston 34 in a direction in which the volume of the rear chamber 66 is reduced.

(a-2) The air in the control pressure chamber 122 is bled together with the working fluid along a path 224 into the reservoir 52 via the pressure-reduction linear valve 162 and the reservoir passage 84. This operation reduces an amount of air in an air reduction target portion 225 including the control pressure chamber 122, the pressure-reduction linear valve 162, and the reservoir passage 84. The air in the control pressure chamber 122 can be reliably bled also by backward movement of the control piston 114, in other words, movement of the control piston 114 in a direction in which the volume of the control pressure chamber 122 is reduced.

It is noted that the pressure-increasing linear valve 160 may not be switched to the closed state and may be kept in the open state. In this configuration, air in the pressure-increasing linear valve 160 can also be reduced.

(b) Air Reduction for Reaction Force Chamber 62, Stroke Simulator 90, and so on As illustrated in FIG. 7, the reservoir cut-off valve 86 is open, and the reaction force chamber 62, the stroke simulator 90, and so on communicate with the reservoir 52. The air in the reaction force chamber 62 and the stroke simulator 90 is bled together with the working fluid along a path 226 into the reservoir 52 via the simulator passage 88, the reservoir cut-off valve 86, and the reservoir passage 84. This operation reduces an amount of air in an air reduction target portion 227 including the reaction force chamber 62, the stroke simulator 90, the simulator passage 88, and the reservoir cut-off valve 86. Also, since the reaction force chamber 62 communicates with the reservoir 52, the pressurizing piston 34 is moved forward, in other words, the pressurizing piston 34 is moved in a direction in which the volume of the reaction force chamber 62 decreases. This movement can also reliably bleed the air out of the reaction force chamber 62.

It is noted that a bleeder plug 230 provided on the stroke simulator 90 may be opened by an operator. The air in the reaction force chamber 62, the simulator passage 88, the stroke simulator 90, and so on can be bled from the bleeder plug 230.

(c) Air Reduction for Downstream Side of Pressure Chambers 40, 42

As illustrated in FIG. 7, bleeder plugs 232 provided on the respective brake cylinders 6, 12 are opened by the operator, so that the pressure chambers 40, 42 are exposed to the atmosphere. The air in the pressure chambers 40, 42 is bled together with the working fluid along paths 234, 236 from the bleeder plugs 232 via the fluid passages 44, 46, the slip control device 16, and the brake cylinders 6, 12. This operation reduces an amount of air in air reduction target portions 238, 239 including the pressure chambers 40, 42, the fluid passages 44, 46, and the brake cylinders 6, 12. Forward movement of the pressurizing pistons 32, 34 can also bleed the air out of the pressure chambers 40, 42.

It is noted that all the bleeder plugs 232 provided on the respective brake cylinders 6, 12 may not be opened, and the four bleeder plugs 232FL, FR, RL, RR may be partly kept closed. Also, the bleeder plug may be provided on a downstream side of the pressure chambers 40, 42 (except the brake cylinders).

In the present embodiment, air reduction is performed in a case where the vehicle is at rest, the hydraulic brakes 4, 10 are not working, and an air reduction command is output. This air reduction is in most cases performed in a place such as a repair factory and an inspection factory.

Figure 3:
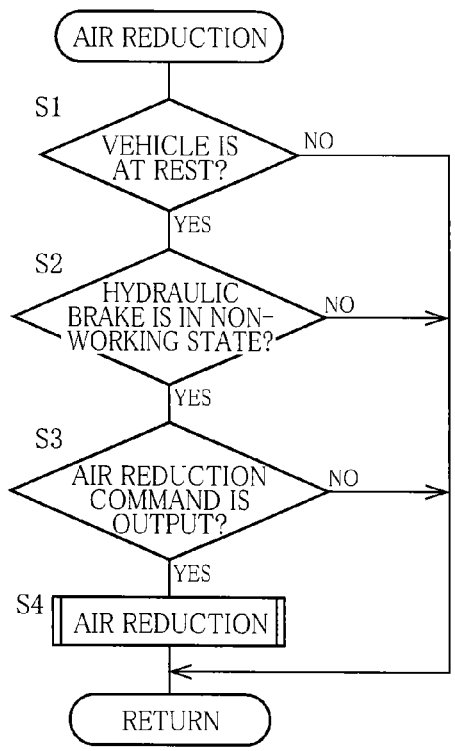
FIG. 3 is a flow chart illustrating an air reduction program stored in a storage device of the brake ECU.

An air reduction program illustrated in FIG. 3 is executed each time when a predetermined length of time has passed. At step 1 ("step" is omitted where appropriate), it is determined whether the vehicle is stopped or not. In the present embodiment, it is determined that the vehicle is stopped, when the parking brake switch 204 is "ON", for example. At S2, it is determined whether the hydraulic brakes 4, 10 are in the non-working states or not. For example, it is determined that the hydraulic brakes 4, 10 are not working in a case where no current is supplied to the coils of the pressure-increasing linear valve 160 and the pressure-reduction linear valve 162 or in a case where the brake pedal 24 is not depressed. It is determined at S3 whether the air reduction command has been supplied or not. For example, it can be determined that the air reduction command has been output in a case where the manual operating member 202 has been operated or in a case where an usual operation has been performed such as successive depressions of the accelerator pedal.

The air reduction is not performed when a negative decision (NO) is made at at least one of S1-S3. When positive decisions (YES) are made at S1-S3, the air reduction is executed at S4.

Figure 4:
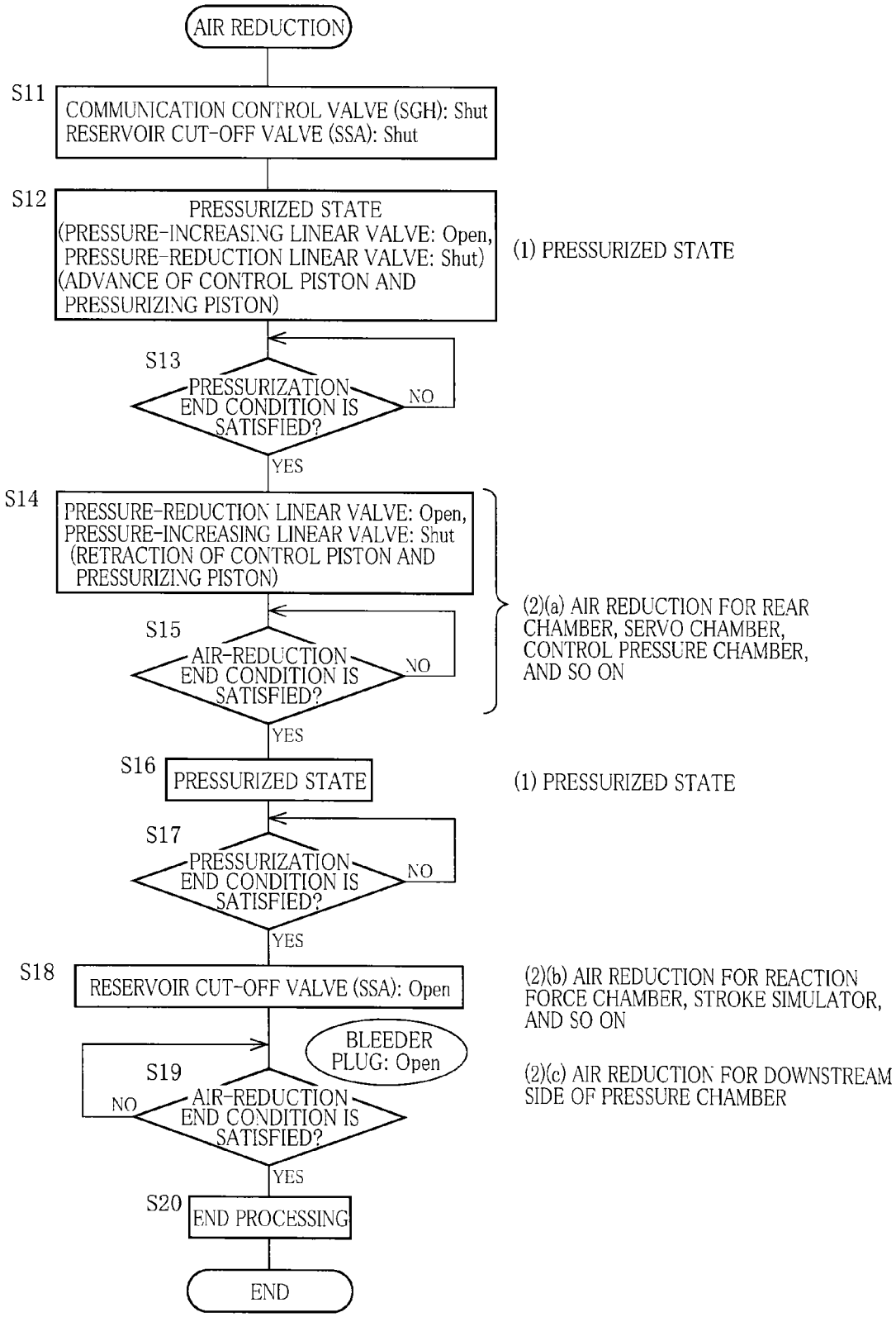
FIG. 4 is a flow chart illustrating a part of the air reduction program.

FIG. 4 is a flow chart illustrating the processing at S4.

At S11, the communication control valve 82 is closed, and the reservoir cut-off valve 86 is closed. At S12, the pressurized state is established. The pressure-reduction linear valve 162 is closed, and the pressure-increasing linear valve 160 is opened. These operations move the control piston 114 forward, which advances the pressurizing pistons 32, 34. Hydraulic pressures are produced in the control pressure chamber 122, the servo chamber 124, the rear chamber 66, the pressure chambers 40, 42, and the reaction force chamber 62. It is determined at S13 whether a pressurization end condition is satisfied or not. For example, it is determined that the pressurization end condition is satisfied, in a case where a time elapsed from the switch of the pressure-increasing linear valve 160 to the open state has reached a pressurization end time and/or in a case where a value detected by the servo-hydraulic-pressure sensor 156 and/or a value detected by the operation hydraulic sensor 92 has reached a set pressure appropriate for the air reduction.

When the pressurization end condition is satisfied, the pressure-increasing linear valve 160 is closed, and the pressure-reduction linear valve 162 is opened at S14, so as to reduce an amount of air in the air reduction target portions 221, 222, 225. The processing at S14 (the open state of the pressure-reduction linear valve 162) is executed until an air-reduction end condition is satisfied at S15. For example, it can be determined that the air-reduction end condition is satisfied, in a case where a time elapsed from a switch of the pressure-reduction linear valve 162 to the open state has reached a first air-reduction time by which it can be considered that the amount of air in the air reduction target portions 221, 222, 225 is reduced.

When the air-reduction end condition is satisfied, the pressure-reduction linear valve 162 is closed, and the pressure-increasing linear valve 160 is opened at S16, so that the pressurized state is established again. When the pressurization end condition is satisfied, a positive decision (YES) is made at S17, and the reservoir cut-off valve 86 is opened at S18. This operation reduces an amount of air in the air reduction target portion 227 illustrated in FIG. 7. Also, the operator opens the bleeder plugs 232 provided on the brake cylinders 6, 12 to reduce an amount of air in the air reduction target portions 238, 239. At S19, when a time elapsed from a switch of the reservoir cut-off valve 86 to the open state has passed a second air-reduction time by which it can be considered that an amount of air in the reaction force chamber 62, the stroke simulator 90, the pressure chambers 40, 42, and so on is reduced, the air-reduction end condition is satisfied, and this flow goes to S20 at which an end processing is executed in which the illustrated original states of the respective electromagnetic valves are established, for example. Also, the bleeder plugs 232 are closed again.

In a construction in which the execution of the processings at S18 and S20 is notified from the notifying device 206, the operator can recognize the timing of opening or closing the bleeder plugs 232. The operator can close the bleeder plugs 232 after recognizing the completion of the air reduction for the air reduction target portions 238, 239 based on, e.g., a state of bleeding of working fluid from the bleeder plugs 232. This configuration eliminates the need to notify the execution at S20.

In the present embodiment as described above, the pressure-increasing linear valve 160 and the pressure-reduction linear valve 162 are controlled to move the control piston 114 and the pressurizing pistons 32, 34, whereby the air in the air reduction target portions 221, 222, 225, 227, 238, 239 can be reliably reduced.

Also, since the air reduction target portions 221, 222, 225, 227, 238, 239 are fluidically coupled with low pressure sources such as the reservoir 52 and the atmosphere after the pressurized state is established, the air in the air reduction target portions 221, 222, 225, 227, 238, 239 can be reliably bled together with the working fluid.

In the case where an amount of air in the air reduction target portions 238, 239 (i.e., portions located on a downstream side of the pressure chambers 40, 42) is reduced, more than two operators are conventionally required, for example, one operator depresses the brake pedal 24, and another operator opens the bleeder plugs 232. However, the present embodiment eliminates a need for the operator to depress the brake pedal 24 because the pressurizing pistons 32, 34 are moved forward by the control of the rear-hydraulic-pressure control device 28. As a result, it is possible to reduce the number of operators required for air reduction, improving working efficiency.

Since the hydraulic pressure in the accumulator 108 is utilized, the hydraulic pressure in the control pressure chamber 122 can be increased rapidly, thereby shortening a time required for air reduction. Also, there is no need to drive the pump 105, resulting in a reduced amount of energy consumption in air reduction. Furthermore, when compared with a case where the pressure of ejection of the pump 105 is utilized, a greater hydraulic pressure difference is caused between a high-pressure side and a low-pressure side of the pressure-increasing linear valve 160 in the case where the pressure-increasing linear valve 160 is switched from the closed state to the open state. Thus, the working fluid can pass through the pressure-increasing linear valve 160 at a higher flow rate, and thereby the working fluid can be reliably supplied to the control pressure chamber and so on, whereby the air can be reliably bled.

In the present embodiment, a control-piston moving-force control device is constituted by the linear valve device 104 and so on. An air reducing device is constituted by the air reduction program storage 216 of the brake ECU 20, a portion of the brake ECU 20 which executes the air reduction program, and so on. The servo chamber 124 corresponds to an output chamber, and a communication/isolation mechanism is constituted by the valve member 144, the axial direction passage 146, and so on. A control-piston moving device and a low-pressure-source communication switching device are constituted by a portion of the air reducing device which stores and executes the processings at S12 and S14.

The air reduction target portion 222 corresponds to a second air reduction target portion, the air reduction target portion 221 corresponds to a fourth air reduction target portion, and the air reduction target portion 225 corresponds to a third air reduction target portion. A second air reducing device, a third air reducing device, and a fourth air reducing device are constituted by a portion of the air reducing device which stores and executes the processings at S12-S15, and so on.

The air reduction target portion 227 corresponds to a fifth air reduction target portion. A fifth air reducing device is constituted by a portion of the air reducing device which stores and executes the processings at S11 and S16-S18, and so on.

Each of the air reduction target portions 238, 239 corresponds to a first air reduction target portion. A first air reducing device is constituted by a portion of the air reducing device which stores and executes the processings at S16, S17, and S19, and so on.

A pressurizing-piston moving-force control device is constituted by the rear-hydraulic-pressure control device 28 and so on.

It is possible to consider that a brake hydraulic-pressure control device is constituted by the hydraulic-pressure producing device 14 and so on, each of the pressurizing pistons 32, 34 corresponds to a piston, each of the pressure chambers 40, 42 corresponds to a hydraulic-pressure chamber, and the rear-hydraulic-pressure control device 28 corresponds to a moving-force control device. Also, it is possible to consider that the brake hydraulic-pressure control device is constituted by the rear-hydraulic-pressure control device 28 and so on, the control piston 114 corresponds to the piston, the servo chamber 124 corresponds to the hydraulic-pressure chamber, and the linear valve device 104 corresponds to the moving-force control device.

It is noted that the above (a) (the air reduction for the rear chamber and so on (S12-15)), the above (b) (the air reduction for the reaction force chamber and so on (S16-19)), and the above (c) (the air reduction for the pressure chamber and so on (S16, S17, the operation of the operator, and S19)) may not be successively performed and may be performed separately or in different order.

All of the above (a) (the air reduction for the rear chamber and so on), the above (b) (the air reduction for the reaction force chamber and so on), and the above (c) (the air reduction for the pressure chamber and so on) may not be performed, and at least one of them may be performed.

The processings at S16 and S17 may be executed after the execution of the processing at S18. That is, the pressurizing pistons 34, 32 may be moved forward in the state in which the reaction force chamber 62 and the reservoir 52 communicate with each other. Also, the pressurizing pistons 32, 34 may be moved forward in the open state of the bleeder plug 230, 232.

The processings at S12-S15 may be repeated a plurality of times. That is, the hydraulic pressure in the control pressure chamber 122 is repeatedly increased and reduced, and thereby the control piston 114 is reciprocated a plurality of times, whereby air in the air reduction target portions 221, 222, 225 can be reliably discharged. Also, the processings at S16-18 may be repeated a plurality of times. By reciprocating the pressurizing pistons 32, 34 a plurality of times, the amount of air in the air reduction target portion 227 can be reliably reduced.

The above (a) (the air reduction for the rear chamber and so on) and the above (b) (the air reduction for the reaction force chamber and so on) may be performed in use of a user.

Each of the control-piston moving-force control device and the pressurizing-piston moving-force control device may include an electric motor and a motion converter.

In the above (c) (the air reduction for the pressure chamber and so on), the hydraulic pressure in the rear chamber 66 may be controlled to move the pressurizing pistons 32, 34 forward in the open states of the bleeder plugs 232. In this configuration, there is no need to notify the operator of the timing of opening or closing the bleeder plugs 232, and the notifying device 206 is unnecessary.

Also, in the above (b) (the air reduction for the reaction force chamber and so on), the pressurizing pistons 32, 34 may be moved forward in the open state of the bleeder plug 230.

An external device provided outside the vehicle (e.g., a PC or equipment provided in a repair factory, for example) may be connected to the brake ECU 20 to supply the air reduction command. Also, the external device may store the air reduction program and so on and instruct air reduction in the hydraulic brake system of the vehicle.

It is to be understood that the invention is not limited to the details of the illustrated embodiment, but may be embodied with various changes and modifications, which may occur to those skilled in the art, without departing from the spirit and scope of the invention. For example, one housing may be provided for the first housing 30 of the master cylinder 26 and the second housing 110 of the regulator 102. Also, the configuration of the hydraulic brake system to which the present invention is applied is not limited.

What is claimed is:

1. A hydraulic brake system, comprising:
a master cylinder comprising (a) a first housing, (b) a pressurizing piston fluid-tightly and slidably fitted in the first housing, (c) a pressure chamber provided in front of the pressurizing piston and connected to a brake cylinder, and (d) a rear chamber provided at a rear of the pressurizing piston;
a rear-hydraulic-pressure control device comprising (i) a second housing, (ii) a control piston fluid-tightly and slidably fitted in the second housing, (iii) an output chamber provided opposite the control piston, and (iv) a control-piston moving-force control device configured to apply a moving force to the control piston and configured to control the moving force, the rear-hydraulic-pressure control device being configured to supply a hydraulic pressure in the output chamber to the rear chamber; and
an air reducing device comprising a second air reducing device configured to, by controlling the control-piston moving-force control device, move the control piston and establish communication between the output chamber and a low pressure source to reduce air in a second air reduction target portion comprising the output chamber,
wherein the rear-hydraulic-pressure control device comprises a communication/isolation mechanism provided between the output chamber and the low pressure source, and a state of the communication/isolation mechanism is switchable between a communicating state in which the output chamber and the low pressure source communicate with each other and an isolated state in which the output chamber and the low pressure source are isolated from each other, and
wherein the second air reducing device comprises (i) a control-piston moving device configured to control the control-piston moving-force control device to move the control piston and (ii) a low-pressure-source communication switching device configured to switch the state of the communication/isolation mechanism from the isolated state to the communicating state,
wherein the control-piston moving-force control device comprises (i) a control pressure chamber provided on an opposite side of the control piston from the output chamber, (ii) a pressure increase valve provided between the control pressure chamber and a high pressure source, and (iii) a pressure reduction valve provided between the control pressure chamber and the low pressure source,
wherein the control-piston moving device is configured to control the pressure increase valve and the pressure reduction valve to move the control piston, and
wherein the air reducing device further comprises a third air reducing device configured to reduce air in a third air reduction target portion comprising the control pressure chamber, by establishing an open state of the pressure increase valve and a closed state of the pressure reduction valve to increase a hydraulic pressure in the control pressure chamber and thereafter establishing an open state of the pressure reduction valve to establish communication between the control pressure chamber and the low pressure source.

2. The hydraulic brake system according to claim 1, wherein the second air reducing device is configured to reduce air in the second air reduction target portion by establishing an open state of the pressure increase valve and a closed state of the pressure reduction valve to cause movement of the control piston to isolate the output chamber from the low pressure source to increase the hydraulic pressure in the output chamber and thereafter establishing an open state of the pressure reduction valve to move the control piston in a direction opposite from a direction of the movement to establish communication between the output chamber and the low pressure source.

3. The hydraulic brake system according to claim 1, wherein the high pressure source comprises an accumulator configured to accumulate working fluid discharged from a pump, with the working fluid being accumulated in a pressurized state.

4. The hydraulic brake system according to claim 1, wherein the air reducing device comprises a fourth air reducing device configured to control the rear-hydraulic-pressure control device to reduce air in a fourth air reduction target portion comprising the rear chamber as the hydraulic-pressure chamber.

5. A hydraulic brake system, comprising:
a master cylinder comprising (a) a first housing, (b) a pressurizing piston fluid-tightly and slidably fitted in the first housing, (c) a pressure chamber provided in front of the pressurizing piston and connected to a brake cylinder, and (d) a rear chamber provided at a rear of the pressurizing piston;
a pressurizing-piston moving-force control device configured to apply a moving force to the pressurizing piston and configured to control the moving force; and
an air reducing device comprising a first air reducing device configured to control the pressurizing-piston moving-force control device to advance the pressurizing piston to reduce air in a first air reduction target portion comprising the pressure chamber, wherein the pressurizing-piston moving-force control device comprises a rear-hydraulic-pressure control device comprising (i) a second housing, (ii) a control piston fluid-tightly and slidably fitted in the second housing, (iii) an output chamber provided opposite the control piston, and (iv) a control-piston moving-force control device configured to apply a moving force to the control piston and configured to control the moving force, the rear-hydraulic-pressure control device being configured to supply a hydraulic pressure in the output chamber to the rear chamber, wherein the pressurizing piston comprises a first piston portion and a second piston portion, wherein the pressure chamber is provided in front of the first piston portion, wherein the rear chamber is provided at a rear of the second piston portion, wherein the master cylinder is provided in front of the second piston portion and comprises a reaction force chamber independent of the pressure chamber, and wherein the air reducing device further comprises a fifth air reducing device configured to control the rear-hydraulic-pressure control device to advance the pressurizing piston to reduce air in a fifth air reduction target portion comprising the reaction force chamber.

6. The hydraulic brake system according to claim 1, wherein the first air reducing device is configured to control the rear-hydraulic-pressure control device to advance the pressurizing piston to reduce the air in the first air reduction target portion.

* * * * *